July 24, 1956  A. W. PEARCE  2,755,559
CHAIN GAUGE FOR A CHAIN SAW
Filed May 2, 1952
2 Sheets-Sheet 1

INVENTOR
ARTHUR W. PEARCE
BY
Mason & Graham
ATTORNEYS

July 24, 1956  A. W. PEARCE  2,755,559
CHAIN GAUGE FOR A CHAIN SAW
Filed May 2, 1952  2 Sheets-Sheet 2
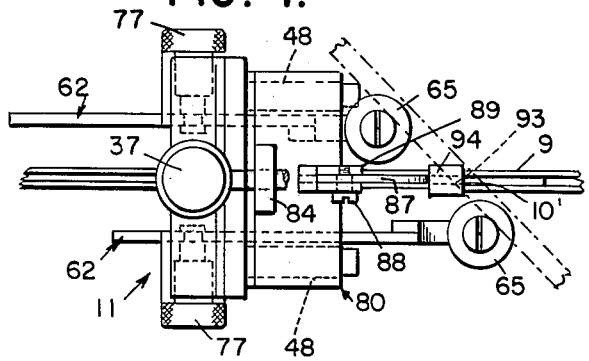
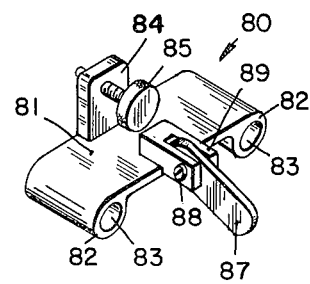
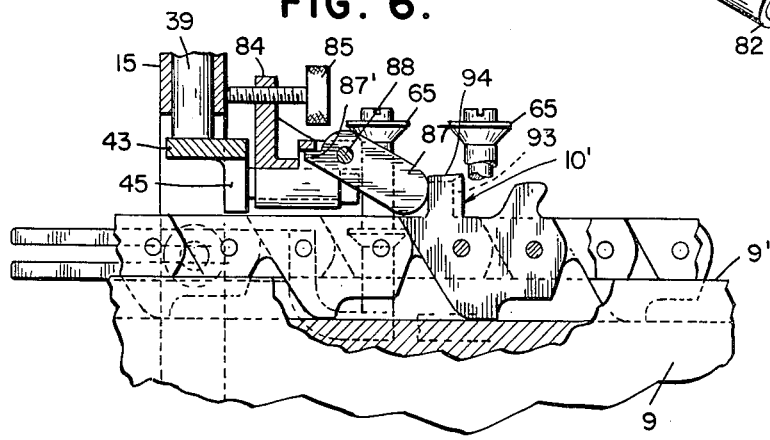
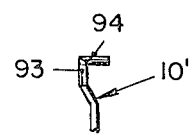
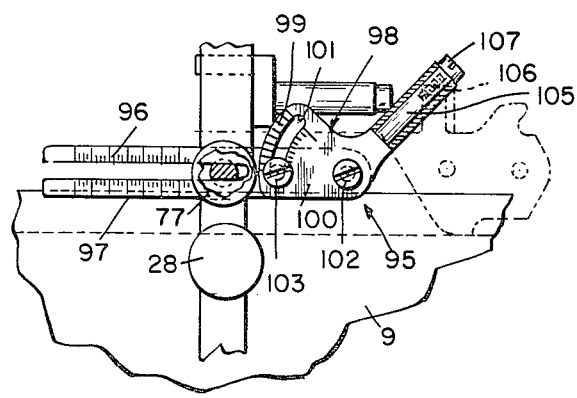
INVENTOR
ARTHUR W. PEARCE
BY
*Mason & Graham*
ATTORNEYS United States Patent Office 2,755,559
Patented July 24, 1956

2,755,559

CHAIN GAUGE FOR A CHAIN SAW

Arthur W. Pearce, El Monte, Calif.

Application May 2, 1952, Serial No. 285,731

9 Claims. (Cl. 33—202)

This invention has to do with combined gauges and jointers for use in sharpening saws, particularly chain saws.

An object of the invention is to provide a novel device for use in sharpening chain saws which is useful both as a gauge for checking the saw teeth and also as a guide for filing the teeth in the sharpening operation.

Another object is to provide a gauge and file guide device that can be readily mounted on a chain saw guide plate to enable the chain to be filed in place on the guide plate thereby insuring correct height-gauging and filing of the teeth and proper squaring of the teeth with the plate.

A further object is to provide a device of the type indicated which incorporates means for accurately gauging the height of the teeth relative to each other and incorporating means for filing the teeth to the desired relative heights.

A further object is to provide a device of the type indicated embodying adjustable means for accurately guiding a file at the proper angle to insure sharpening of the various type teeth at their proper angles.

These and other objects will be apparent from the drawings and the following description.

Referring to the drawings:

Fig. 4 is a view similar to Fig. 3 showing a tooth holder mounted on the gauge;

Fig. 4A is a fragmentary front end elevation of a tooth;

Fig. 5 is a perspective view of the tooth holder;

Fig. 6 is a partial elevational view similar to Fig. 1 showing the tooth holder and showing the vertical guides in position for filing; and Fig. 7 is a view similar to Fig. 6 showing another form of file guide.

Figure 1:
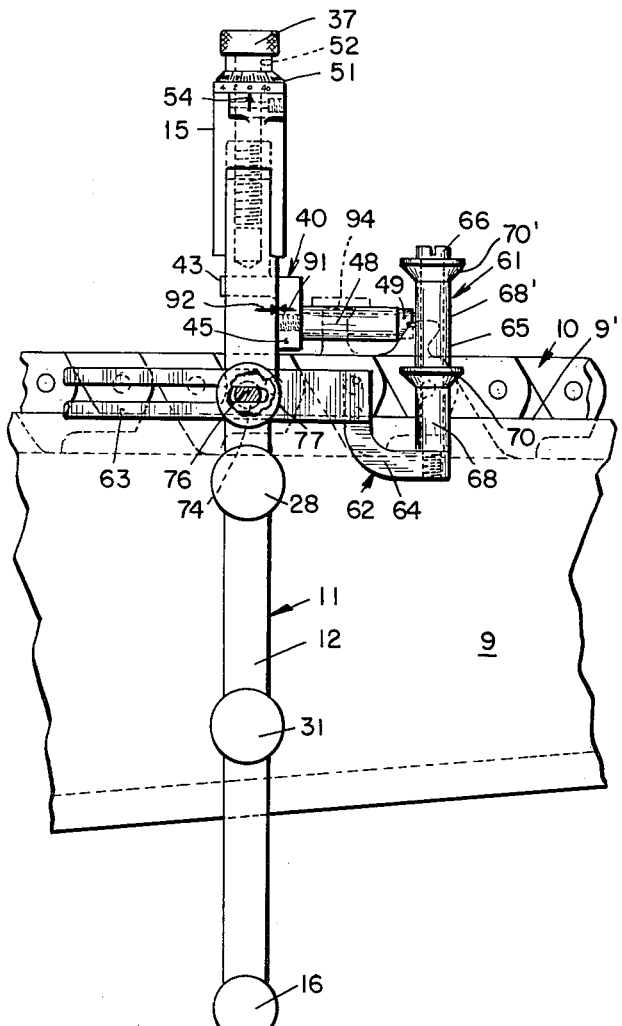
Fig. 1 is a side elevational view of a device embodying the invention shown mounted on a chain saw, the latter being only fragmentarily shown.
Figure 2:
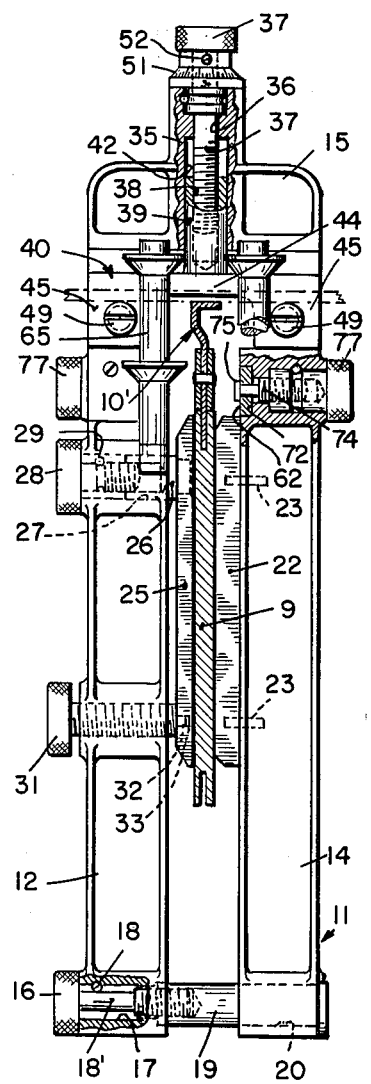
Fig. 2 is a sectional elevational view at right angles to Fig. 1.

More particularly describing the invention, the gauging and filing guide or gauge and jointer is shown mounted on the guide plate 9 of a saw having the chain 10. The gauge and jointer includes a frame, generally indicated by 11, which may be described as having the general form of an inverted, narrow U and including the parallel spaced legs 12 and 14 and the connecting portion 15. At the lower end the legs are detachably connected by a screw 16 which is mounted for rotation in a bore 17 in leg 12. The screw is held to limited axial movement by a threaded pin 18 received extending transversely of the screw within a reduced portion 18' thereof. The screw threads into a cylindrical spacer nut 19 which is mounted for axial movement in a bore 20 in leg 14.

The inner side of the leg 14 is provided with a stationary spacer bar 22 which may be removably mounted as by dowels 23. Opposite this the leg 12 is provided with a movable spacer bar 25 which is supported at its upper end on a sleeve 26 received in a bore 27 and movable axially by an adjustment screw 28 threading thereinto, the screw 28 being held against axial movement by pin 29. The lower end of the bar 25 is mounted on a screw 31 threadedly mounted in leg 12, the screw having a short pin 32 which is received in a cylindrical recess 33 in the bar.

The upper or closed end 15 of the frame is provided with a central boss 35 which has a bore 36 to receive adjustment screw 37. The screw is threadedly received in the bore 38 of the shank 39 of a height gauge 40. The shank of the height gauge is axially movable in a counterbore 42 in the boss 35.

The height gauge includes a central portion 43 upon which the shank is mounted and elongated section 44 which terminates in depending end portions 45. Extending at right angles to the portion 44 of the gauge and at right angles to the legs of the frame are a pair of file guide rollers 48 which are individually mounted upon pins 49 secured in the depending portions 45 of the height gauge.

It will be apparent that the height gauge may be vertically adjusted by rotating the screw 37. Preferably the screw is provided with a collar 51 bearing suitable gradation marks and indicia which may be adjustably fixed to the screw by a set screw 52. Also, the exterior of the boss 35 is provided with one or more reference marks 54 for use in conjunction with the marks on the collar 51.

As will later be described, the height gauge is for use in accurately determining the height of the teeth of the saw and also for the purpose of providing a file guide means for filing the teeth all to the same height, the two rollers 48 forming a support for a flat file which can be laid across them to file the teeth.

Each of the legs of the frame is provided with means for mounting a file guide member which extends generally parallel with the guide plate 9, generally indicated by numeral 61. The file guide members each comprise a bracket 62 having a bifurcated body 63 and a curved extension 64. Mounted on the extension at right angles to the portion 63 and extending transverse of the guide plate is a file guide roller 65 which rotates on a suitable pin 66 secured in the end portion 64 of the bracket. Each roller 65 comprises the two cylindrical sections 68 and 68' and the two frustro-conical or conoidal sections 70 and 70'.

The upright file guides are mounted in horizontal recesses 72 in the legs of the frame and are clamped in place by means which in each case comprises a taxe-up screw 74 having a head 75 and a flat portion 76, the latter being received in the slot between the bifurcated body 63 of the bracket. The screw is received in a take-up nut 77 mounted in the frame.

I provide a tooth holder attachment 80 for the height gauge which is used as an abutment against which to place the tooth being filed. This attachment comprises a plate-like body 81 which terminates at each side in depending marginal sections 82 bored at 83. The device is adapted to be slipped onto the file guide rollers 48 which are received in the bores 83. The attachment includes an upstanding portion 84 having a set screw 85. A dog 87 is pivotally mounted on the body by pin 88 supported in a bifurcated portion 89. The dog has an extension 87' which serves to limit movement of the dog as shown in Fig. 6.

In the use of the gauge and jointer, the device is first mounted upon the saw guide plate with the longitudinal axis of the gauge at right angles to the edge 9' thereof. This is accomplished by retracting screw 16 and nut 19 to permit of the legs being slipped over the saw laterally thereof, and subsequently retightening the screw and nut. In mounting the device the height gauge is first lowered so that a reference mark 91 thereon registers with a reference mark 92 on the body of the device. The device is then so positioned on the saw that the central portion 43 of the height gauge rests on one of the teeth 10'. The movable spacer bar 25 is then tightened against the saw plate to hold the device in place.

Figure 3:
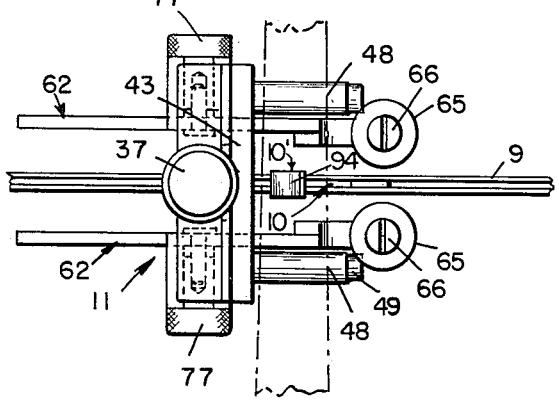
Fig. 3 is a plan view of the device of Fig. 1.

It will be assumed that the chain has been cleaned, oiled, and adjusted and that the groove in the plate also has been cleaned and oiled. After the gauge and jointer has been mounted, the height gauge is raised and the teeth are brought into the filing area which is to the right of the main body of the device as viewed in Figs. 1, 3, 4, and 6. The height gauge is ordinarily set at a height such that a file laid across the rollers 48 will just touch the highest part of the lowest tooth. The other teeth are then successively brought into the filing area and filed to be level with the lowest tooth.

At the time the height gauge is set to the lowest tooth, or at some time before it is raised, the micro gauge on the height gauge is set on the reference mark. After the teeth have been filed on top, the height gauge is lowered a given distance (usually specified by the manufacturer of the saw) to the correct amount or difference in height between the cutter teeth and the depth guides. The depth guides are then filed off in the same manner.

The next step is to place the tooth holder attachment 80 in place on the height gauge so that the forward horizontal faces forward and vertical faces of the cutter teeth may be filed. One of the upright file guides is then advanced relative to the other as shown in Figs. 4 and 6. The file guides are so positioned that when a file is laid across the rollers of the two guides, the angle of the file with respect to the plane of the saw is the required angle of the cutting face of the tooth to be filed. A tooth is then brought into the filing area and advanced to the position where a square file laid against the cylindrical sections 68' of the advanced guide roller and across section 68 of the other roller at the junctures of these sections with the conoidal sections 70' and 70, respectively, will file the vertical face 93 of the tooth. The tooth holder attachment is then set in this position to provide a firm abutment for holding the tooth in place and the tooth then filed, first on the face 93 with the square file laid across the cylindrical sections 68' and 68 as set forth above and shown in Fig. 4. Subsequently the upper or horizontal surface 94 of the tooth is filed with the same file by using the upper conical guide surface of the outermost or advanced upright guide member and the lower conical guide face of the other upright guide member as guides. The remainder of the similar teeth are then filed, after which the position of the two upright file guides is reversed for filing the teeth which face oppositely on the other side.

In Fig. 7 I show another type of file guide means. This is designed for use in filing so-called standard chain saws which have five different teeth, namely left and right cutters, left and right rakers, and center rakers. Referring to Fig. 7, I show a pair of file guide members 95 mounted on the gauge and jointer 11. These each have a slotted body 96 by means of which they can be mounted on the device in the same manner as and in place of the upright file guides 61 previously described. The body 96 is provided with indicia such as gradation marks 97 to facilitate proper setting. Each body 96 carries a pivotally mounted member 98 having a plate section 100 with a slot 101 concentric with the pivotal axis 102. A set screw 103 carried by the body 96 passes through the slot and provides a means of releasably securing the part 98 at a desired angle. Suitable indicia as gradation marks 99 may be provided on the plate section for indicating the degree of disposition thereof.

The member 98 carries a cylindrical stud 105 upon which is rotatably mounted a sleeve-like roller 106 retained by a screw 107. The two rollers form a means of guiding a file laid thereacross.

The file guide means shown in Fig. 7 is used by extending the appropriate member 98 farther than the other to obtain one component of the angle of the tooth surface to be filed and by adjusting the members 98 to elevate sleeves 106 to the other required component of the angle of the tooth surface to be filed. A flat file is then laid across the under surface of the sleeve 106 for the filing operation during which the tooth is held by holder 80.

Although the invention has been particularly shown and described, it is contemplated that various changes and modifications can be made without departing from the scope thereof as indicated by the following claims.

I claim:

1. In a chain saw gauge and jointer, a frame comprising a rigid body of U-shape having parallel legs and a joining portion, and detachable means for connecting the free ends of the legs, said detachable means comprising a screw rotatably mounted in one leg and means on the other leg affording a threaded bore for the reception of said screw, said last-mentioned means extending laterally of said other leg toward said one leg a sufficient distance whereby to act as a spacer to prevent said legs being drawn together out of parallelism.

2. In a chain saw gauge and jointer, a frame, means carried by said frame for detachably securing the same to a chain saw guide plate with an end portion of the frame projecting beyond the lateral margin of said plate, a height gauge mounted in said end portion of said frame for movement toward and away from the chain saw guide plate, means for adjustably positioning said height gauge, a pair of laterally spaced, parallel file guide rollers carried by said height gauge, said rollers being disposed with their axes in a plane normal to the direction of movement of said height gauge and to the plane of said guide plate, and a tooth holder means removably mounted on the rollers of said height gauge.

3. In a chain saw gauge and jointer, a frame, means on said frame for clamping the frame to the guide plate of the saw, a pair of laterally spaced parallel file guides mounted on said frame and projecting laterally of the frame in a direction at right angles thereto and parallel with the guide plate, said guides each including an upright roller extending transversely of the guide plate, and means for individually adjustably securing said file guides with said rollers at variable distances from said frame.

4. In a chain saw gauge and jointer, a frame, means on said frame for clamping the frame to the guide plate of the saw, a pair of laterally spaced file guides mounted on said frame and projecting laterally of the frame in a direction at right angles to the direction of their spacing, said guides each including an upright roller, and means for individually adjustably securing said file guides to position said rollers at selected distances from said frame while maintaining their spacing laterally of a plane passing through the center of the frame.

5. In a chain saw gauge and jointer, a vertical frame, means on said frame for clamping the frame to the guide plate of the saw, a pair of laterally spaced file guides mounted on said frame and projecting laterally of the frame in a direction at right angles to the direction of their spacing, said guides each including a roller, means for adjustably positioning the angle of inclination of said roller to the horizontal, and means for individually adjustably securing said file guides with said rollers at selected distances from said frame.

6. In a chain saw gauge and jointer, a frame, means carried by said frame for detachably securing the same to a chain saw guide plate with an end portion of the frame projecting beyond the lateral margin of said plate, a height gauge mounted in said end portion of said frame for movement toward and away from the chain saw guide plate, means for adjustably positioning said height gauge, a first pair of laterally spaced, parallel file guide rollers carried by said height gauge, said rollers being disposed with their axes in a plane normal to the direction of movement of said height gauge and to the plane of said guide plate, a tooth holder means on said guide rollers, said tooth holder means being adjustably positionable axially of said rollers, and a second pair of laterally spaced parallel file guide rollers mounted on said frame, said second pair of rollers being disposed with their axes in planes parallel to the planes containing the axis of the first pair but with the axes of the second pair angularly disposed with reference to the first pair.

7. In a chain saw guide and jointer, a frame comprising a rigid body of U-shape having parallel legs and a joining portion, and detachable means for connecting the free ends of the legs, said detachable means comprising a screw rotatably mounted in one leg and an internally threaded spacer member mounted in the other leg in axial alignment with said screw, said spacer member projecting laterally of said other leg for abutment with said one leg, said spacer member being retractable through said other leg to provide clear passage space between said legs.

8. In a chain saw gauge and jointer, a frame comprising a body of elongated U-shape having parallel legs and having a joining portion at one end, means carried by said legs intermediate the ends of the body for clamping a chain saw guide plate between said legs, said means comprising a stationary spacer bar mounted on the inner side of one leg, a movable spacer bar opposite said stationary bar, and screw means carried by said other leg supporting said movable spacer bar for movement toward and away from the stationary spacer bar, and detachable means carried by said legs for connecting and maintaining said legs in proper spaced relation at their free ends.

9. A device as set forth in claim 8 in which said stationary spacer bar is detachably mounted.

References Cited in the file of this patent

UNITED STATES PATENTS

| | | |
|---|---|---|
| 98,447 | Tyson | Dec. 28, 1869 |
| 810,610 | Bishop | Jan. 23, 1906 |
| 857,438 | Bryson | June 18, 1907 |
| 1,003,904 | Higbee | Sept. 19, 1911 |
| 1,361,777 | Ross | Dec. 7, 1920 |
| 2,010,218 | Carlson | Aug. 6, 1935 |
| 2,171,169 | Woodbury | Aug. 29, 1939 |
| 2,369,338 | Carlson et al. | Feb. 13, 1945 |
| 2,438,687 | Stone | Mar. 30, 1948 |
| 2,594,821 | Stone et al. | Apr. 29, 1952 |
| 2,612,702 | Pearce | Oct. 7, 1952 |
| 2,645,145 | Larson | July 14, 1953 |